(No Model.)
A. J. POWELL & W. H. HALL.
ELECTRIC BATTERY SYSTEM.
No. 537,358. Patented Apr. 9, 1895.
BEST AVAILABLE COPY
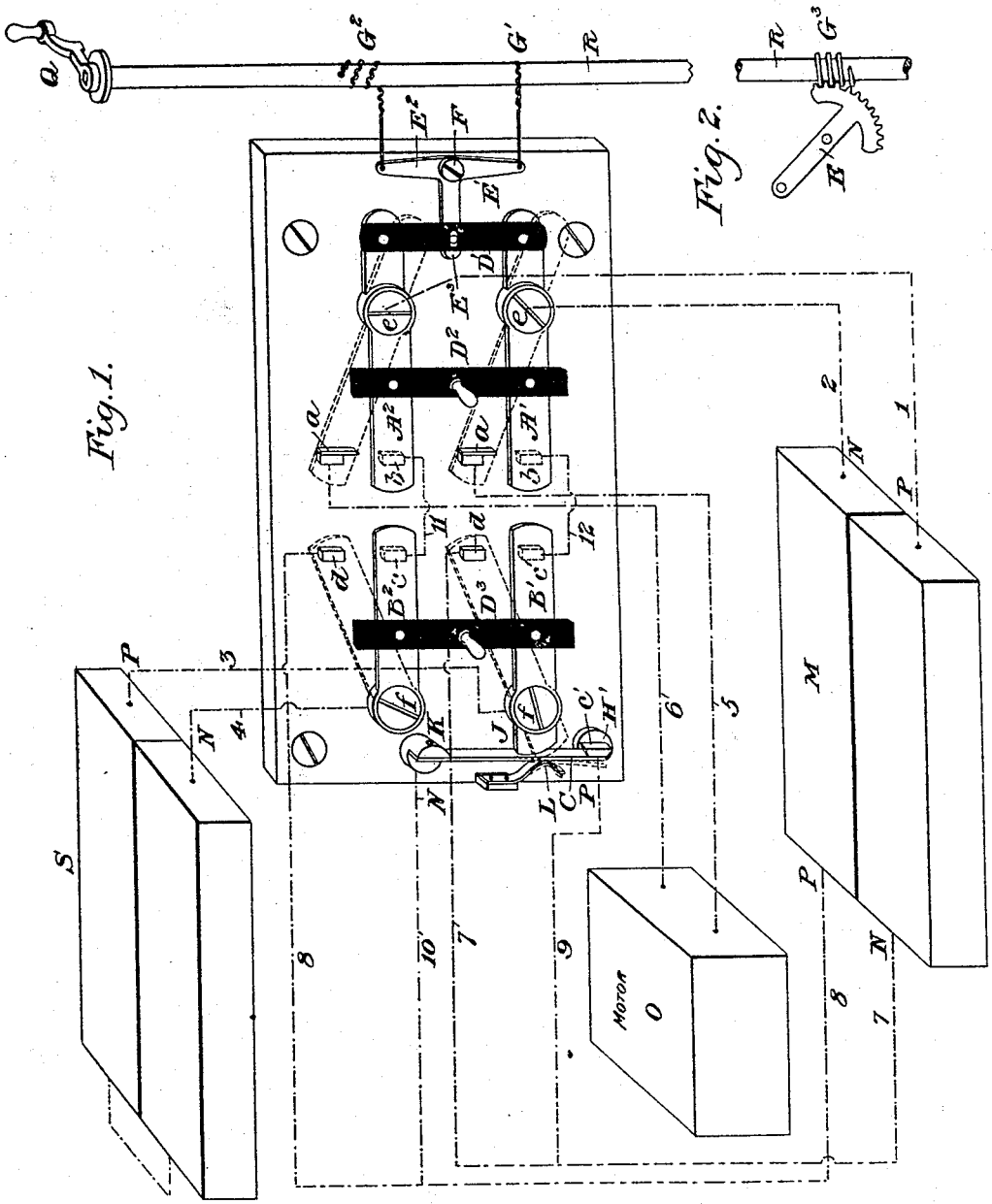
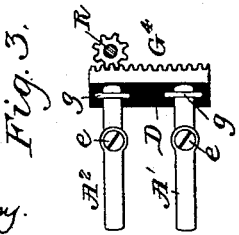
Witnesses
Inventors
Admiram J. Powell
William H. Hall

UNITED STATES PATENT OFFICE.

ADONIRAM JUDSON POWELL AND WILLIAM H. HALL, OF BROOKLYN, NEW YORK.

ELECTRIC-BATTERY SYSTEM.

SPECIFICATION forming part of Letters Patent No. 537,358, dated April 9, 1895.

Application filed November 13, 1894. Serial No. 528,664. (No model.)

*To all whom it may concern:*

Be it known that we, ADONIRAM JUDSON POWELL and WILLIAM H. HALL, citizens of the United States of America, and residents of Brooklyn, in the State of New York, have invented a new and useful Improvement in Electric-Battery Systems, of which the following is a specification.

This invention relates to means for using secondary or "storage" batteries, for the propulsion of street-cars and other vehicles and for other purposes, in locations where it is not convenient or economical to employ a dynamo driven by steam or other power; and it is not to be confused with those systems in which secondary batteries are combined with such dynamos to regulate and control the electric current supplied to the motor or other translating device. It is also to be distinguished from those systems in which secondary batteries are periodically charged *in situ* by stationary conductors, or otherwise charged by means of currents derived from dynamos.

The primary object of the present invention is to extend the life of a given storage battery, hereinafter termed the main battery, from a few hours to as many or more days, by combining therewith a suitable primary battery of intensity, hereinafter termed the supplemental battery, which is automatically switched into circuit with the main battery whenever the motor is cut out, and may also be used in series with the main battery, as hereinafter described and claimed.

Another object of the invention is to provide for so connecting a supplemental battery with the main battery in a feeding circuit, and for so connecting the batteries in series with an electric motor or its equivalent, by a peculiarly simple and compact switch, primarily designed to be inclosed within the least possible space against the dash-board of a street-car, but adapted for use in like manner in connection with other translating devices.

The invention consists in certain novel combinations of parts, as hereinafter set forth and claimed.

A sheet of drawings accompanies this specification as part thereof.

Figure 1 of the drawings is a diagrammatic perspective view representing our improved battery system as a whole. Fig. 2 is a fragmentary elevation representing a modification; and Fig. 3 is a fragmentary plan view partly in section illustrating another modified mechanical detail, as hereinafter more particularly specified.

Like letters and numbers refer to like parts in all the figures.

M, Fig. 1, represents a main battery, composed of a sufficient number of secondary or storage cells in any approved way; S, a supplemental battery, preferably of carbon cells, for feeding and otherwise supplementing said main battery; O, an electric motor of any approved make to be driven by said batteries; Q, a hand-crank or its equivalent managed by the motorman, and R the shaft or rod turned by said crank Q or its equivalent. The remainder of the drawings represent an electric switch of peculiar construction, and mechanical and electrical connections between the parts, as hereinafter specified.

$A'$ $A^2$ and $B'$ $B^2$ represent two pairs of switch-bars; C, a supplemental switch-bar working in connection with the switch-bar $B'$, and $D'$ $D^2$ and $D^3$ connecting cross-pieces causing the switch-bars $A'$ $A^2$ and $B'$ $B^2$ respectively to work in unison.

$E'$ $E^2$ and $E^3$ (Fig. 1) represent the respective arms of a three-armed lever, mechanically connected through the medium of a cross-piece $D'$ with said switch-bars $A'$ and $A^2$; F, the pivot of said lever, and $G'$ $G^2$ chain, or rod and chain, connections between said rod R and the arms $E'$ and $E^2$ respectively of said three-armed lever.

$H'$ and K represent two of the switch-terminals for the electric connections of the system, and L the spring of said switch-bar C, which spring may be of any approved form.

$a$ and $b$ represent the contacts of each of the switch-bars $A'$ and $A^2$ in their respective positions; $c$ and $d$, those of the switch-bars $D'$ and $D^2$, and $c'$ the contact of the switch-bar C.

$e$ and $f$ represent the pivots of the switch-bars $A'$ $A^2$ and $B'$ $B^2$ respectively; and 1 2 3 4 5 6 7 8 9 10 11 and 12, respectively, represent wires electrically connecting the parts of the system, as set forth in the following statement of its operation.

The switch-bars A' A² and B' B² normally occupy the positions in which they are shown in full lines in Fig. 1, and connect the supplemental battery S with the main battery M in a feeding circuit as follows: The positive pole (P) of the supplemental battery S is connected by a wire 3 to the pivot $f$ of the switch-bar B', and through this switch-bar and its contact $c$ and the wire 12 with the contact $b$ of the switch-bar A' and its pivot $e$, and through the latter and the wire 2 with the negative terminal (N) of the main battery M; the positive terminal (P) of said main battery being connected by the wire 1 with the pivot $e$ of the switch-bar A²; through this switch-bar, its contact $b$, and the wire 11, with the contact $c$ of the switch-bar B²; and through this switch-bar, its pivot $f$ and the wire 4 with the negative pole (N) of said supplemental battery S; said supplemental switch-bar C forming in connection with its contact $c'$, the terminals H' and K, and the wires 9 and 7 and 10 and 8, a direct connection between the two sections into which the main battery M is conveniently divided.

When the crank Q and rod R or their equivalents are actuated to start the motor O, motion is transmitted by said mechanical connections G' and G² through the arms E' and E² to the arm E³ of said three-armed lever, and thence through said cross-piece D' to the switch-bars A' and A²; turning the latter on their pivots, and shifting their contact-ends from $b$ to $a$, as shown in dotted lines at those parts of the drawings here referred to. This cuts out said supplemental battery S at $b$, and connects the poles of the main battery M with the motor O through said wire 1, said pivot $e$ of the switch-bar A², this switch-bar and its said contact $a$, said wires 6 and 5, the contact $a$ of the switch-bar A', this switch-bar and its pivot $e$, and said wire 2; this being the ordinary working circuit.

In case of any weakness or trouble in the main battery M when the circuit is closed through the motor, the contact-ends of the switch-bars B' and B² are shifted by means of the cross-piece D³ from $c$ to $d$, as in dotted lines; which cams the switch-bar C away from its contact $c'$, by means of an extension J of the switch-bar B', and breaks the connection which is normally closed through the wires 7 and 9, terminal H', contact $c'$, switch-bar C, terminal K and wires 10 and 8. The two batteries are now connected in a "series of intensity," or in other words combined into one large battery, in series with the motor, as follows: Starting at the positive pole (P) of the supplemental battery S, the current flows through the wire 3 to the pivot of the switch-bar B', through this switch-bar its contact $d$ and the wire 7 to the main battery M, and thence through the wire 1 to the pivot $e$ of the switch-bar A², and through this switch-bar, its contact $a$ and the wire 6, to the motor O; returning through the wire 5, the contact $a$ of the switch-bar A', this switch-bar, its pivot $e$, the wire 2, the main battery M, the wire 8, the contact $d$ of the switch-bar B², this switch-bar, its pivot $f$, and the wire 4, to the negative pole (N) of the supplemental battery S. Sufficient power to carry an otherwise disabled street-car to the power house, or for use in a like emergency, is thus insured.

By shifting the switch-bars B' and B² in the opposite direction as compared with their movement represented by dotted lines, the supplemental battery may be cut out entirely so as to use the main battery alone while it is sufficiently fresh.

The wires 5 and 6 leading to and from the motor will in practice extend by way of a current regulating and reversing device operated by the crank Q or its equivalent, as is customary; and other like electrical and mechanical details are to be supposed.

The switch-bars A' and A² may be automatically operated as above from a rod or lever at the motor, through mechanical connections G' G² or equivalents thereof; and other like modifications will suggest themselves to those skilled in the art.

The modification illustrated by Fig. 2 consists of an equivalent for said mechanical connections G' and G² and said three-armed lever E' E² E³. In the modification the rod R is provided with a worm G³ in mesh with the teeth of a sector lever E, which is intended to work on the pivot F, Fig. 1, and to connect with the cross-bar D', Fig. 1, as a substitute for said three-armed lever.

In the modification illustrated by Fig. 3, which relates to the same part of the system, the switch-bars A' and A² are extended behind their pivots $e$, and such extensions are suitably connected, as by staples $g$, with a sliding bar D of ebonite or the like, which is connected by a rack and pinion G⁴ with the rod R or its equivalent; motion being transmitted from the latter through said rack and pinion G⁴ and said sliding bar D and staples $g$ or their equivalent to the switch-bars A' and A² to shift the latter simultaneouly as in the arrangement first described.

Having thus described the said improvement, we claim as our invention and desire to patent under this specification—

1. The combination with an electric motor and suitable electrical and mechanical connections of a main battery, a supplemental battery, an electric switch comprising two pairs of switch-bars, movable independently of each other, normally connecting said batteries in a feeding-circuit, means for automatically reversing one pair of said switch-bars to open said circuit when the main battery is connected with the motor, and means for reversing the other switch-bars at will independently of said first pair, substantially as hereinbefore specified.

2. The combination with an electric motor and suitable electrical and mechanical connections of a main battery, a supplemental battery, an electric switch comprising a supplemental switch-bar which normally closes a direct electrical connection between two sections of said main battery, and means for connecting the batteries in series and breaking said direct connection; whereby said supplemental battery may be converted at will from a feeding battery into an enlargement of the main battery, substantially as hereinbefore specified.

3. The combination with the crank-rod R or its equivalent and suitable mechanical connections of the switch-bars $A'$ $A^2$ and $B'$ $B^2$, their contacts $a$ $b$ and $c$ $d$, the wires 1 2 3 4 5 and 6, electrical connections between said contacts $b$ and $c$, a main battery from the respective terminals of which said wires 1 and 2 extend to said switch-bars $A'$ $A^2$, a supplemental battery from the respective terminals of which said wires 3 and 4 extend to said switch-bars $B'$ $B^2$, and a translating device to the respective terminals of which said wires 5 and 6 extend from said contacts $a$, substantially as hereinbefore specified.

4. The combination with the rod R or its equivalent and suitable mechanical connections of the pair of switch-bars $A'$ and $A^2$, their contacts $a$ and $b$, the contacts $c$ electrically connected with said contacts $b$, the contacts $d$ opposed to said contacts $c$, the switch-bars $B'$ and $B^2$ one of them provided with a camming extension J, the supplemental switch-bar C, its contact $c'$, the wires numbered 1 to 10 inclusive, the main battery M, the supplemental battery S, and a motor O, substantially as hereinbefore specified.

ADONIRAM JUDSON POWELL.
WILLIAM H. HALL.

Witnesses:
GEORGE W. WOOLLEY,
F. L. BROWN.